United States Patent
Humphrey et al.

(10) Patent No.: US 10,944,445 B2
(45) Date of Patent: Mar. 9, 2021

(54) METHOD AND APPARATUS FOR TRANSMITTING DATA OVER A PLURALITY OF PAIRS OF WIRES

(71) Applicant: BRITISH TELECOMMUNICATIONS PUBLIC LIMITED COMPANY, London (GB)

(72) Inventors: Leslie Humphrey, London (GB); Anas Al Rawi, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 16/088,588

(22) PCT Filed: Mar. 30, 2017

(86) PCT No.: PCT/EP2017/057638
§ 371 (c)(1),
(2) Date: Sep. 26, 2018

(87) PCT Pub. No.: WO2017/167938
PCT Pub. Date: Oct. 5, 2017

(65) Prior Publication Data
US 2019/0089408 A1    Mar. 21, 2019

(30) Foreign Application Priority Data

Mar. 31, 2016  (EP) ..................................... 16163311

(51) Int. Cl.
*H04B 3/50* (2006.01)
*H04B 3/32* (2006.01)
(Continued)

(52) U.S. Cl.
CPC ................. *H04B 3/50* (2013.01); *H04B 3/00* (2013.01); *H04B 3/32* (2013.01); *H04L 1/00* (2013.01);
(Continued)

(58) Field of Classification Search
CPC .... H04B 3/50; H04B 3/32; H04B 3/00; H04L 25/0276; H04L 25/0272; H04L 1/00; H04L 1/18; H04M 11/062
See application file for complete search history.

(56) References Cited

U.S. PATENT DOCUMENTS 5,550,836 A    8/1996  Albrecht
5,576,874 A    11/1996 Czerwiec
(Continued)

FOREIGN PATENT DOCUMENTS

CN    1471791 A    1/2004
CN    102668611 A    9/2012
(Continued)

OTHER PUBLICATIONS

Machine translated English version of Foreign Reference DE102006045901 (Year: 2008).*
(Continued)

*Primary Examiner* — Sam K Ahn
*Assistant Examiner* — Amneet Singh
(74) *Attorney, Agent, or Firm* — Nixon & Vanderhye P.C.

(57) ABSTRACT

A set of data signals is transmitted over at least three pairs of wires. The data signals comprise a first and second subsets of data signals. A first set of transmission signals, each transmission signal in the first set of transmission signals being derived from a combination of all of the data signals in the first subset of data signals, is generated. A second set of transmission signals, each transmission signal in the second set of transmission signals being derived from a
(Continued)

single respective one of the data signals in the second subset of data signals, is generated. Each of the transmission signals in the first set is transmitted in a common mode over a respective one of the plurality of pairs of wires. Each of the transmission signals in the second set is transmitted over a respective one of the plurality of pairs of wires in a differential mode.

10 Claims, 5 Drawing Sheets

(51) Int. Cl.
| | | |
|---|---|---|
| *H04L 1/00* | (2006.01) | |
| *H04B 3/00* | (2006.01) | |
| *H04M 11/06* | (2006.01) | |
| *H04L 25/02* | (2006.01) | |
| *H04L 1/18* | (2006.01) | |

(52) U.S. Cl.
CPC ...... *H04L 25/0272* (2013.01); *H04L 25/0276* (2013.01); *H04M 11/062* (2013.01); *H04L 1/18* (2013.01)

(56) References Cited

U.S. PATENT DOCUMENTS

| | | | |
|---|---|---|---|
| 6,507,608 | B1 | 1/2003 | Norrell |
| 7,392,301 | B1 | 6/2008 | Perry, Jr. et al. |
| 7,561,625 | B1 | 7/2009 | Searles et al. |
| 8,411,696 | B1 | 4/2013 | Ko et al. |
| 8,601,289 | B1 | 12/2013 | Smith |
| 8,964,884 | B2* | 2/2015 | Liang .................. H04M 11/062 375/295 |
| 10,069,617 | B2 | 9/2018 | Al Rawi et al. |
| 10,097,236 | B2 | 10/2018 | Al Rawi et al. |
| 10,305,716 | B2 | 5/2019 | Humphrey et al. |
| 2006/0268966 | A1 | 11/2006 | Cioffi et al. |
| 2007/0237248 | A1* | 10/2007 | Jung ........................ H04L 5/023 375/260 |
| 2008/0069017 | A1 | 3/2008 | Clausen |
| 2009/0201984 | A1* | 8/2009 | Du ....................... H04L 27/2613 375/240 |
| 2010/0244998 | A1* | 9/2010 | Peyton ................. G01R 31/022 333/24 R |
| 2011/0170424 | A1 | 7/2011 | Saeid |
| 2011/0206014 | A1* | 8/2011 | Lee ....................... H04L 1/1861 370/335 |
| 2013/0083725 | A1 | 4/2013 | Mallya |
| 2013/0195232 | A1 | 8/2013 | Liang et al. |
| 2014/0185701 | A1 | 7/2014 | Liang et al. |
| 2014/0269947 | A1 | 9/2014 | Schneider |
| 2014/0341179 | A1* | 11/2014 | Yokomakura ..... H04W 72/0446 370/330 |
| 2015/0017851 | A1 | 4/2015 | Wellbrock |
| 2015/0288417 | A1 | 10/2015 | Gomez-Moreno |
| 2015/0327310 | A1 | 11/2015 | Miura |
| 2016/0013864 | A1 | 1/2016 | Rafel Porti |
| 2017/0155424 | A1* | 6/2017 | Feyh ........................ H04B 3/04 |
| 2017/0244446 | A1 | 8/2017 | Al Rawi et al. |
| 2018/0034618 | A1 | 2/2018 | Al Rawi et al. |
| 2018/0062700 | A1 | 3/2018 | Al Rawi et al. |
| 2018/0083815 | A1 | 3/2018 | Humphrey et al. |
| 2019/0089408 | A1 | 3/2019 | Humphrey et al. |

FOREIGN PATENT DOCUMENTS

| | | |
|---|---|---|
| DE | 10 2006 045901 | 4/2008 |
| EP | 2 091 196 A1 | 8/2009 |
| EP | 2209325 | 7/2010 |
| EP | 2 429 114 A1 | 3/2012 |
| EP | 2 538 567 A1 | 12/2012 |
| EP | 14 250 116 | 9/2014 |
| WO | 2011/061722 A1 | 5/2011 |
| WO | 2013/026479 | 2/2013 |
| WO | 2013/143604 A1 | 10/2013 |
| WO | 2016/139156 A1 | 9/2016 |
| WO | 2016/139254 A1 | 9/2016 |

OTHER PUBLICATIONS

U.S. Appl. No. 16/087,739, filed Sep. 24, 2018 (46 pgs.).
U.S. Appl. No. 15/562,165, filed Sep. 27, 2017 (39 pgs.).
International Search Report for PCT/EP2017/057638 dated Apr. 19, 2017, 3 pages.
Written Opinion of the ISA for PCT/EP2017/057638 dated Apr. 19, 2017, 8 pages.
Office Action dated Jan. 23, 2020 issued in U.S. Appl. No. 16/087,739 (9 pgs.).
International Preliminary Report on Patentability for corresponding International Application No. PCT/EP2017/057603 dated Oct. 2, 2018; 7 pages.
International Search Report and Written Opinion for corresponding International Application No. PCT/EP2017/057603 dated Jun. 20, 2017; 9 pages.
Cioffi et al.; "CuPON: The Copper Alternative to PON 100 Gb/s DSL Networks", 0163-6804/07 © 2007 IEEE Communications Magazine—Jun. 2007; pp. 132-139; 8 pages total.
Law et al.; Quantum Communications; "Evolution of Ethernet Standards in the IEEE 802.3 Working Group"; 0163-6804/13 © 2013 IEEE Communications Magazine—Aug. 2013; pp. 88-96; 9 pages total.
Moraes, et al.; "The Rate Maximization Problem in DSL with Mixed Spectrum and Signal Coordination"; 19th European Signal Processing Conference (EUSIPCO 2011); Barcelona, Spain, Aug. 29-Sep. 2, 2011; pp. 1583-1587; 5 pages total.
GB Search Report; GB Application No. GB 1605480.1; dated Sep. 30, 2016; 6 pages.
Office Action dated Jul. 17, 2020 issued in U.S. Appl. No. 16/087,739 (11 pgs.).
Office Action dated Aug. 4, 2020 issued in Chinese Application No. 201680013379.7 (7 pgs.).
Office Action dated Jul. 21, 2020 issued in Chinese Application No. 201780067106.5 (9 pgs.).
European Search Report dated Apr. 14, 2015 issued in European Application No. EP 15 27 5058 (4 pgs.).
Rodrigo B. Moraes et al., "General Framework and Algorithm for Data Rate Maximization in DSL Networks", IEEE Transactions on Communications, vol. 62, No. 5, May 2014 (13 pgs.).
International Search Report dated Apr. 21, 2016 issued in International Application No. PCT/EP2016/054167 (3 pgs.).
Office Action dated Jun. 8, 2020 issued in U.S. Appl. No. 16/338,106 (9 pgs.).
Mayevskiy, Measuring crosstalk in differential signals, Nov. 1, 2004, EDN Network, 3 pages. (Years: 2004).
Written Opinion of the ISA for PCT/EP2016/054167, dated Apr. 21, 2016, 5 pages.
Search Report for EP 15275058.4 dated Apr. 22, 2015, 5 pages.
Office Action dated Dec. 18, 2020 issued in Chinese Application No. 201780028060.6 (7 pgs.).

* cited by examiner

METHOD AND APPARATUS FOR TRANSMITTING DATA OVER A PLURALITY OF PAIRS OF WIRES

This application is the U.S. national phase of International Application No. PCT/EP2017/057638 filed Mar. 30, 2017 which designated the U.S. and claims priority to EP Patent Application No. 16163311.0 filed Mar. 31, 2016, the entire contents of each of which are hereby incorporated by reference.

FIELD OF THE INVENTION

The present invention relates to a method of, and apparatus for, transmitting data over a plurality of pairs of wires. Digital Subscriber Line protocols specify methods of transmitting data over (and receiving data from) a pair of metallic wires. Various methods are known for using these protocols in situations where there is more than one pair of wires as discussed below.

BACKGROUND TO THE INVENTION

Where two transceivers are connected to one another via plural pairs of metallic (typically copper) wires (typically twisted pairs of wires to minimise external Radio Frequency Interference (RFI) coupling onto the differential mode of transmission over the metallic pair), several techniques are known for seeking to optimise the data rate which can be supported across such a connection.

In the simplest case, the pairs are simply treated as entirely separate connections. If one ignores the effects of cross talk, in such an arrangement the total amount of bandwidth afforded by the link is the sum of the individual bandwidth provided by a single connection. The effect of cross talk from one line to another, where more than one line is transmitting data simultaneously, and which appears as interference, means that in general the combined bandwidth of n pairs will not in fact be n times the bandwidth achievable by a single connection operating on its own.

In order to make the combination of separate connections appear to higher layers (of the well-known Open Systems Interconnection (OSI) 7 layer model) as a single connection, a technique known as bonding may be used. This simply combines the physical/data link layer connections together to form a single connection from the perspective of network and higher layers of the OSI 7 layer model.

In order to mitigate against the effects of cross talk, it is known to employ a technique known as "vectoring" among the signals transmitted onto the plurality of connections. At the cost of some additional processing in the transceivers, it is possible to greatly reduce the effects of cross talk such that the total bandwidth of all lines operating together approaches much more closely the sum of the bandwidths of each line operating on its own. Moreover, because joint processing can be performed at both ends of the connections in this arrangement, it is possible to employ a multidimensional echo canceller to enable transmissions in both directions to use the same tones (i.e. to achieve a duplex mode of operation) which approaches doubling the total capacity of the connection provided it does not conflict with any relevant regulatory requirements (e.g. a National Access Network Frequency Plan).

In order to further increase the bandwidth of the total connection, it is additionally possible to exploit "phantom channels". Phantom channels are modes of excitation which involve sending signals over more than one pair of wires simultaneously in a manner which is orthogonal to (and therefore non-interfering with) direct differential modes of excitement over any single pair. For example, if there are two pairs of twisted copper pair lines, as well as being able to excite two conventional direct differential mode signals, one over each pair, it is also possible to send a differential phantom mode signal, where the average voltages of each pair are excited, relative to one another, in order to carry a third signal. Since the average (or common) voltage of a twisted pair has no impact on the differential signal across the wires in that pair, the change of average voltage does not change the differential signal across a single pair and so the phantom signal is orthogonal to both of the normal differential mode signals (being carried simultaneously on each pair of wires). This is typically done by providing a centre tap to a transformer used to drive the wires of a twisted pair (see for example EP 2 091 196 for an example of this technique).

It is also possible to create a 2nd order phantom signal if one has, for example, four twisted copper pairs (P1, P2, P3, P4). In such a case, one can create two phantom connections (e.g. Ph12, Ph34) being a difference between the average voltage of P1 and the average voltage of P2 (Ph12) and the difference between the average voltage of P3 and the average voltage of P4 (Ph34); these are first order Phantom connections. However, by taking the average voltage of one of the first order phantoms (e.g. Ph12) and driving this differentially with respect to the average voltage of another one of the first order phantoms (e.g. Ph34) a second order phantom connection can additionally be created which is orthogonal to both of the first order phantom connections as well as the conventional direct differential mode connections over each pair individually. Thus where there are 4 twisted pairs one can generate 7 orthogonal connections (in fact there is also an 8th orthogonal connection possible which is the overall common mode of excitation where the average voltage on all 8 wires is varied with respect to a common ground—i.e. Earth—but this mode is very lossy and very susceptible to external interference and so is generally never actually used in practice). In fact even second order phantoms are rarely used in practice because the difficulties in implementing a transformer with an accurate centre tap itself being connected across two centre taps of driving transformers is very difficult to achieve accurately and even fairly small inaccuracies can result in poor performance of such second order phantom connections.

It should be noted that by constructing phantom mode connections in the conventional above described manner, up to 2n orthogonal channels can be formed where n is the number of pairs of wires (and where we include the never practically used common mode) but only where n is a power of 2 (i.e. for 2, 4, 8, 16 pairs of wires).

WO 2005/094052 describes an alternative method of obtaining plural orthogonal channels over a group of wires. In this document it is proposed to use one wire as a reference wire and to drive differential signals on every other wire, each other wire being driven with respect to the same single reference wire. Such an approach would cause large cross talk between each channel thus formed but the document proposes to mitigate against this by applying vectoring to the various different signals. It should be noted that this approach provides 2n−1 orthogonal channels (not including the never practically used common mode) regardless of the number of pairs, n—i.e. n need not be a power of 2 to obtain 2n−1 orthogonal channels (excluding the common mode) unlike the case in conventional phantom mode channel construction discussed above.

WO 2011/061722 describes yet another method of exciting 2n−1 orthogonal channels regardless of the number of pairs of wires involved. In the method proposed in WO 2011/061722, each wire is excited with a combination of a set of M input signals to be transmitted over the group of wires (where M=2n is the number of individual wires). However, one of these signals is set to zero as it corresponds to the common mode which is not used). It proposes that where M is a power of 2 a Walsh-Hadamard code may be used, but these exist only for codes of length M where M is a power of 2. In order to cater for groups of wires which are not a power of 2, it proposes using Fourier codes instead which are complex valued and thus may involve using phase changes of a signal (other than 180 degrees out of phase— i.e. the inversion of the signal as required in Walsh-Hadamard codes). In this way it is possible to transmit M−1 useful signals over M wires in a manner which is much more balanced than with either the conventional approach to constructing phantoms or the approach described in WO 2005/094052.

SUMMARY OF THE INVENTION

According to a first aspect of the invention, there is provided a method of transmitting a set of data signals over a plurality of pairs of wires, the data signals comprising a first subset of data signals and a second subset of data signals, each of the first and second subsets of data signals comprising at least two different data signals, the method comprising: generating a first set of transmission signals, each transmission signal in the first set of transmission signals being derived from a combination of at least a part of each data signal in the first subset of data signals; generating a second set of transmission signals, each transmission signal in the second set of transmission signals being derived from a single respective one of the data signals in the second subset of data signals; transmitting each of the transmission signals in the first set of transmission signals in a common mode over a respective one of the plurality of pairs of wires; and transmitting each of the transmission signals in the second set of transmission signals over a respective one of the plurality of pairs of wires in a differential mode.

In this way, all of the possible orthogonal channels/modes for transmitting signals for a given set of wires are able to be used. Moreover, the additional processing (e.g. matrix multiplication for performing the combining) for accessing these channels/modes—compared to the conventional case where only the differential channels for each twisted copper pair are exploited (with therefore no phantom modes or channels being exploited)—is restricted to a subset (which is preferably less than half) of the total number of data signals to be transmitted (normally, if there are n pairs, up to 2n−1 data signals can be transmitted in total, with n−1 in the first subset and n in the second subset). This arrangement compares favourably to the system described in WO 2011/061722 in which the additional processing for accessing all 2n−1 orthogonal channels/modes involves all of the data signals to be transmitted. Since such processing needs to be performed for all possible tones (i.e. on a tone-by-tone basis) and for each frame of data, this represents a large amount of additional processing and so saving a significant fraction of this is an important technical advantage over the scheme taught in WO 2011/061722.

In the context of the present specification, the term "common mode" over a pair of wires refers to a manner of exciting the wires in that pair equally. This may conveniently be done (and preferably is done) by providing a centre tap on the driving transformer which drives the respective pair and by exciting this centre tap.

(Note curious readers may wonder with respect to what is the signal applied to this centre tap being driven—the answer is that in some embodiments it is driven with respect to an average value of the common modes of all pairs. This is similar to the manner in which 3 phase power is transmitted over typical power cables using only 3 wires. The signals may conveniently be balanced so that an actual reference point is not needed—as will be well understood by persons skilled in the art of signal processing).

Preferably, combining the first subset of data signals to form a first set of transmission signals includes generating a dummy data signal which does not contain any data which needs to be recovered at a receiver device connected to the plurality of pairs of wires at the distal ends thereof and including the dummy signal in each combination of data signals to form each transmission signal in the first set of transmission signals. The dummy signal is preferably combined within the other data signals in the first subset of data signals in such a way that it is transmitted in the common mode of the complete set of the plurality of pairs of wires and for this reason it does not contain data to be transmitted since such a transmission mode is known to have very poor transmission characteristics meaning that very little data could be successfully recovered at the receiver. It is possible in some embodiments however for the received signal over this common mode channel of the complete set to be analysed by the receiver to obtain an estimate of the external noise impinging onto the system, which may be useful for many different reasons such as noise cancellation or avoidance, etc.

Preferably, the combination of the data signals in the first subset of data signals is done using a Fourier code (or equivalently using an Inverse Spatial Discrete Fourier Transform (ISDFT) matrix—the specifics of which, for a preferred implementation, are described in greater detail below). Persons skilled in the art will appreciate that the effect of using a Fourier code is to transmit the data signals in the first sub-set via composite channels wherein different components, having, in general, differing phases, are transmitted onto the common mode channels of different pairs of wires.

Preferably, generating the transmission signals (including both the first and second sets of transmission signals) includes using an Inverse Fast Fourier Transform (IFFT) unit to perform an inverse fast Fourier transformation of the signals (in digital form) to convert them from a frequency domain representation to a time-domain representation before generating analogue signals based on these digital signals. The transformation is preferably done after a combination of the first sub-set of data signals has been performed, such that the generation of the first set of transmission signals comprises firstly generating combinations of the first sub-set of data signals and then performing a fast Fourier transformation of the thus combined data signals.

According to a second aspect of the present invention, there is provided a transmitting device for transmitting a set of data signals over a plurality of pairs of wires, the data signals comprising a first subset of data signals and a second subset of data signals, each of the first and second subsets of data signals comprising at least two different data signals, the transmitting device comprising:

a processor operable
to generate a first set of transmission signals, each transmission signal in the first set of transmission signals being derived from a combination of at least a part of each data signal in the first subset of data signals; and to generate a second set of transmission signals, each transmission signal in the second set of transmission signals being derived from a single respective one of the data signals in the second subset of data signals; and a transmitter for transmitting each of the transmission signals in the first set of transmission signals in a common mode over a respective one of the plurality of pairs of wires; and transmitting each of the transmission signals in the second set of transmission signals over a respective one of the plurality of pairs of wires in a differential mode.

According to a third aspect of the present invention, there is provided a transmitting device for transmitting a set of data signals over a plurality of pairs of wires each pair of wires having a nearside end and a distal end, the nearside ends being connected to the transmitter and at least some of the distal ends being connected to one or more receiver devices, the data signals comprising a first subset of data signals and a second subset of data signals, the transmitter comprising: an orthogonal discrete coding transformation unit and an inverse fast Fourier transformation unit, the orthogonal discrete coding transformation unit being operable to generate, in combination with the inverse fast Fourier transformation unit, a first set of transmission signals, by combining the data signals in the first subset of data signals using an orthogonal discrete coding transformation and then transforming these into corresponding time domain signals using an inverse fast Fourier transformation, the inverse fast Fourier transformation unit being additionally operable to generate a second set of transmission signals by transforming each data signal in the second subset of data signals into the time domain to form the second set of transmission signals; wherein the transmitter further comprises an analogue front end unit for generating wire driving signals derived from the transmission signals and a series of driving transformers, each of which is connected to the near ends of the wires of a respective one of the pairs of wires, and each driving transformer includes a centre tap connected to receive a driving signal derived from a respective one of the first set of transmission signals, whereby each of the transmission signals in the first set of transmission signals is transmitted in a common mode over a respective one of the plurality of pairs of wires and each of the transmission signals in the second set of transmission signals is transmitted over a respective one of the plurality of pairs of wires in a differential mode.

The orthogonal discrete coding transformation unit may use any suitable orthogonal discrete code such as, for example, a Walsh-Hadamard code, however it is preferred if a spatial Fourier code (such that the orthogonal discrete coding transformation unit is a spatial discrete Fourier transformation unit) since this can be used optimally regardless of the number of pairs of wires—i.e. even in cases where the number of pairs of wires is not an exact power of 2 as is necessary for Walsh-Hadamard codes to be applicable.

Preferably, the transmitting device of either the second or third aspects is part of a transceiver unit comprising a transmitting device as set out in the second or third aspect above forming a transmitter portion, together with a receiver portion which is operable to receive and detect/demodulate transmission signals sent from a corresponding transceiver unit (or units) located at the distal ends of the wire pairs. Thus a typical system involves two transceivers, each including a transmitter portion in the form of a transmitting device in accordance with either the second or third aspect, which transmitter portions are operable to transmit data in accordance with the first aspect of the present invention, the transceivers being interconnected by means of a bundle of pairs of wires.

Such a configuration may preferably be provided between a drop point unit and an exchange (especially in a case where a fibre (optical fibre) connection has been provided between the drop point unit and the exchange but old, legacy copper connections between the drop point unit and the exchange have been left in place, which is common practice)—in such a situation, the connection over the copper connections can be used either to provide additional backhaul bandwidth to that principally provided by the optic fibre connection, or it can be used as a backup in the event that the fibre connection is damaged. An alternative arrangement in which such a configuration of two transceivers (operating in according with preferred embodiments of the present invention) interconnected by a bundle of pairs of wires may be usefully provided is in accordance with the teaching of a co-pending patent application co-filed with the present application and entitled "Telecommunications Access Network" and having Agents' ref A32875. In accordance with preferred aspects of the invention described in that patent application, drop point units are interconnected to one another by means of a bundle of pairs of wires to provide reasonably high bandwidth connections between the drop point units which are local and do not involve traversing (typically optical fibre) connections between the drop point units and one or more exchange buildings. Both of these above described configurations when the connections are formed using embodiments of the present invention are intended to fall within the scope of the present application and the appropriate claims set out at the end of this document.

Naturally, all of the above described aspects and/or embodiments of the invention may be supplemented with additional known techniques such as some form of noise cancellation technology such as vectoring (pre-coding within the transmitter to pre-compensate for the effects of cross-talk—especially Far End Cross Talk (FEXT)—and/or post-processing within a receiver to remove the effects of crosstalk—especially FEXT). In a particularly preferred embodiment which is operating in a point-to-point configuration, Eigen beam-forming techniques may be employed. This involves decomposing the channel matrix into two unitary square matrices and a diagonal matrix comprising the eigenvalues of the channel matrix and then performing a precoding step based on one of the unitary matrices at the transmitter device and a post-coding step based on one of the unitary matrices at the receiver. The identified eigenvalues are additionally used at the receiver end as part of the equalisation/detection process. The mathematical description of this is set out in greater detail below.

An alternative configuration in which the present invention may be implemented is one in which a single transmitter is connected to multiple receivers (each via a respective one or more pairs of wires) which are not collocated with one another (hereinafter referred to as being remote from one another). In such a case some possible phantom mode connections may be unterminated (e.g. if a single transmitter is connected to 3 different, remote receivers, each via a respective single wire pair, then there are no direct complete phantom connections available). Nonetheless, in such a case, it is possible to take advantage of indirect paths whereby energy transmitted onto a phantom path is carried/cross-talked/mode-converted onto a differential mode and can therefore be received at a receiver detecting differential mode signals. In such a case, the first subset of data signals is derived from the second subset of data signals using a combiner module. The precise mathematical description of the processing performed by the combiner module is described below, but it operates such that the signals generated for transmitting over the common modes as the first set of transmission signals (e.g. in preferred embodiments after being processed by the inverse spatial discrete Fourier transformation unit) are orthogonal to each other but can crosstalk couple into the differential mode for reception at a selected receiver such that the cross-talk coupled signals which are received there (in addition to the directly transmitted signals) boost the (directly transmitted) signals travelling over the direct path and therefore improve the signal to noise ratio of the (overall) differential mode signal received at the receiver (compared to the case where no energy is deliberately transmitted onto any of the common modes).

Preferably in such a case vectoring (or an alternative pre-coding technique to counter the effects of cross-talk coupling from neighbouring lines whose transmission signals can be cooperatively controlled) is operated in a conventional manner (using for example a vectoring unit) based on the new channel transfer function associated with the combined effect of the original physical channel formed of the physical wires in conjunction with the effects of the combiner unit and any other additional processing units operating (in signal processing terms) between the vectoring unit (or other equivalent unit if an alternative pre-coding cross-talk cancellation method is being used) and the IFFT unit.

Further aspects of the present invention relate to processor implementable instructions for causing a transmitting device (or transceiver) to carry out the method of the first aspect of the present invention and to carrier means (preferably non-transient carrier means) carrying such instructions.

BRIEF DESCRIPTION OF THE FIGURES

In order that the present invention may be better understood, embodiments thereof will now be described, by way of example only, with reference to the accompanying drawings in which.

DETAILED DESCRIPTION OF EMBODIMENTS

Figure 1:
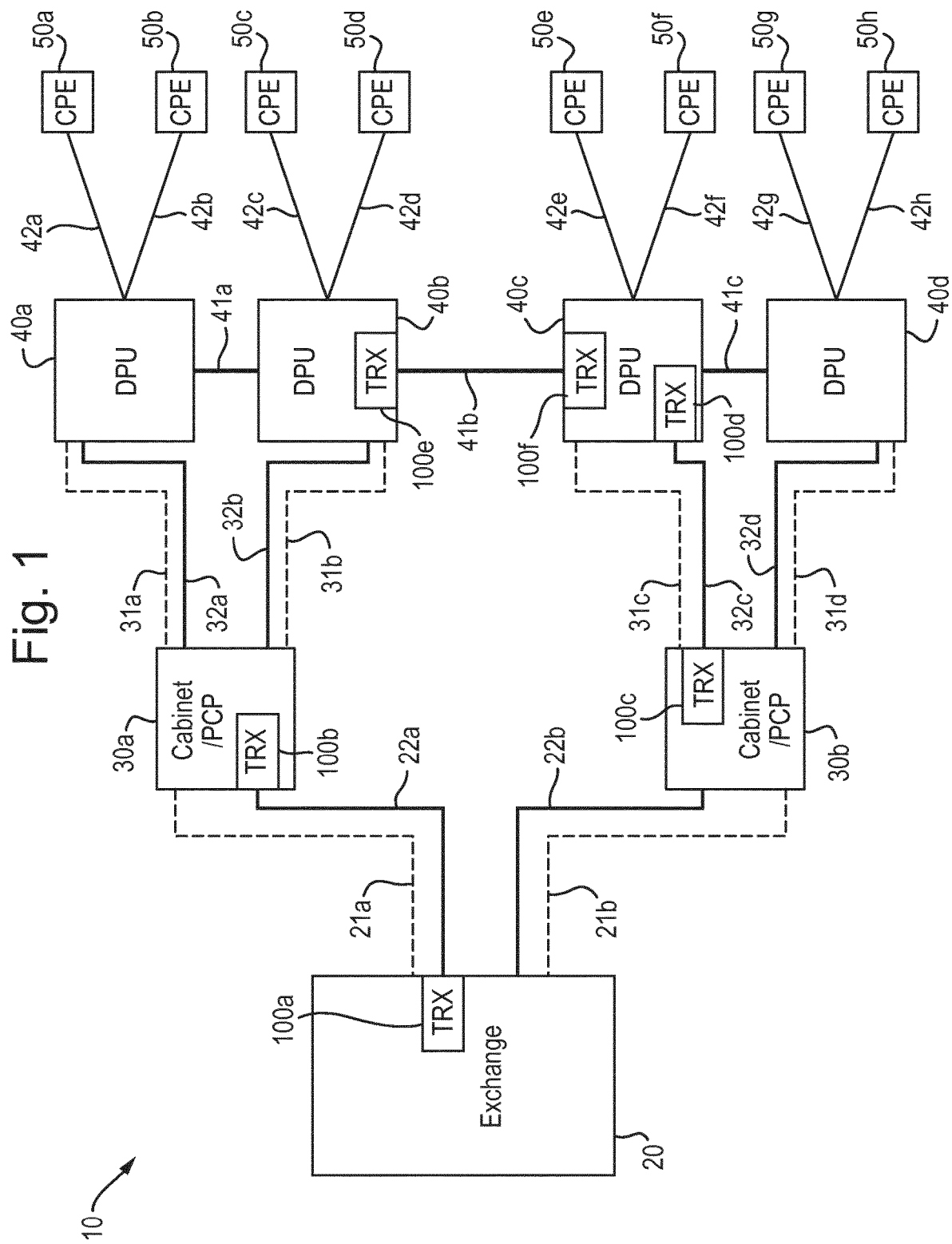
FIG. 1 is a schematic illustration of a part of a telecommunications access network including two sections, forming embodiments of the present invention, which contain connections formed from a bundle of pairs of wires connected between two transceivers.

Referring now to FIG. 1, an access network 10 is illustrated (schematically) comprising an Exchange building 20, two street cabinets or Primary Cross-connection Points (PCPs) 30a, 30b, four Distribution Point Units (DPUs) 40a-40d and eight Customer Premises Equipment (CPE) devices 50a-50h. This of course represents merely a part of a nationwide access network which would include many Exchange buildings interconnected by a high bandwidth core network. Additionally, the two-fold scaling up of devices located ever closer to the edge of the network (i.e. in the direction from Exchange 20 to CPE devices 50—hereinafter referred to as in the "downstream direction") is again arbitrary and for illustrative purposes only—in a typical network several (possibly twenty or more) PCPs are likely to be connected to each Exchange and up to fifty or so DPUs may be connected to each PCP, etc.

FIG. 1 also illustrates how the above-mentioned devices 20, 30, 40, 50 are all interconnected with one another in a hierarchical manner such that each of the upstream devices 20, 30, 40 is connected to two downstream devices 30, 40, 50 via an optical connection 21a, 21b, 31a-31d, and/or a copper connection 22a, 22b, 32a-32d, 42a-42h. Thus Exchange 20 is connected to PCP 30a via a copper connection (e.g. a main cable) 22a (which contains in practice a very large number of twisted copper pairs of wires) and an optical fibre connection 21a as well as being connected to PCP 30b via a copper connection 22b similar to the copper connection 22a, and a fibre connection 21b similar to fibre connection 21a. Similarly, PCP 30a is connected to DPU 40a via a fibre connection 31a and via a copper connection 32a (e.g. a bundle of 50 or so twisted copper pairs—i.e. enough to be able to send at least one pair to each CPE device that could conceivably be connected to the DPU 40 which would typically be up to about 20-30 CPE devices (or network termination points—one for each dwelling normally)—as is normal in the telecommunications field, however, this may well be overprovisioned (e.g. to accommodate the possibility of houses being converted into flats etc.) by using a larger than necessary cable e.g. by using a 50 or 100 pair cable, etc.). Corresponding fibre 31b, 31c, 31d and copper 32b, 32c, 32d connections are in place for connecting PCP 30a to DPU 40b and for connecting PCP 30b to both DPU 40c and DPU 40d. Finally, each DPU 40a, 40b, 40c, 40d is connected to multiple CPE devices 50a-50h via a corresponding copper connection 42a-42h only (e.g. DPU 40a is connected to CPE's 50a and 50b via copper connections 42a and 42b, DPU 40b is connected to CPE's 50c and 50d via copper connections 42c, 42d, etc.). Note that these final copper connections 42a-42h typically comprise just one or possibly two pairs (in which case one of the pairs is generally a spare pair which is not connected to the CPE).

FIG. 1 also illustrates some additional copper connections 41a, 41b, 41c which interconnect between DPU's 40a and 40b, between DPU's 40b and 40c and between DPU's 40c and 40d. The purpose of these connections is explained more fully in the co-pending, co-filed patent application with agents' ref A32875 referred to above. In the present embodiment, these connections 41a-41c are again copper cables which comprise many (e.g. 50 or 100) copper connections and thus are similar in this respect to copper connections 32a-32d (rather than say copper connections 42a-42h, or copper connections 22a and 22b).

Finally, FIG. 1 also illustrates transceivers 100a-100f located at both ends of copper connections 22a, 32c and 41b. These transceivers 100, in the present embodiment, all operate to efficiently communicate data over a plurality of metallic pairs in a manner described in greater detail below.

Figure 2:
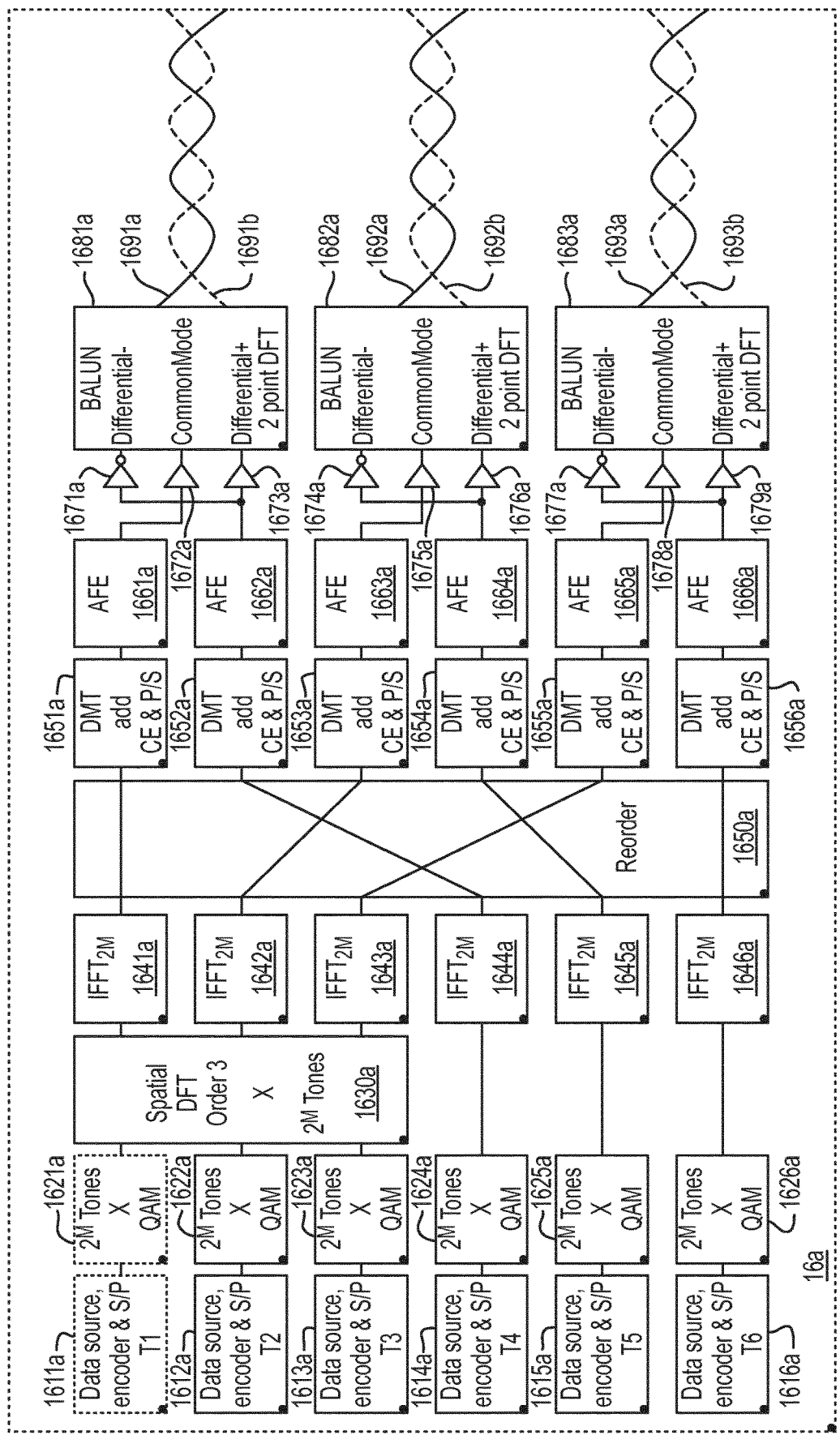
FIG. 2 is a schematic illustration of a transmitter portion of one of the transceivers of FIG. 1.
Figure 3:
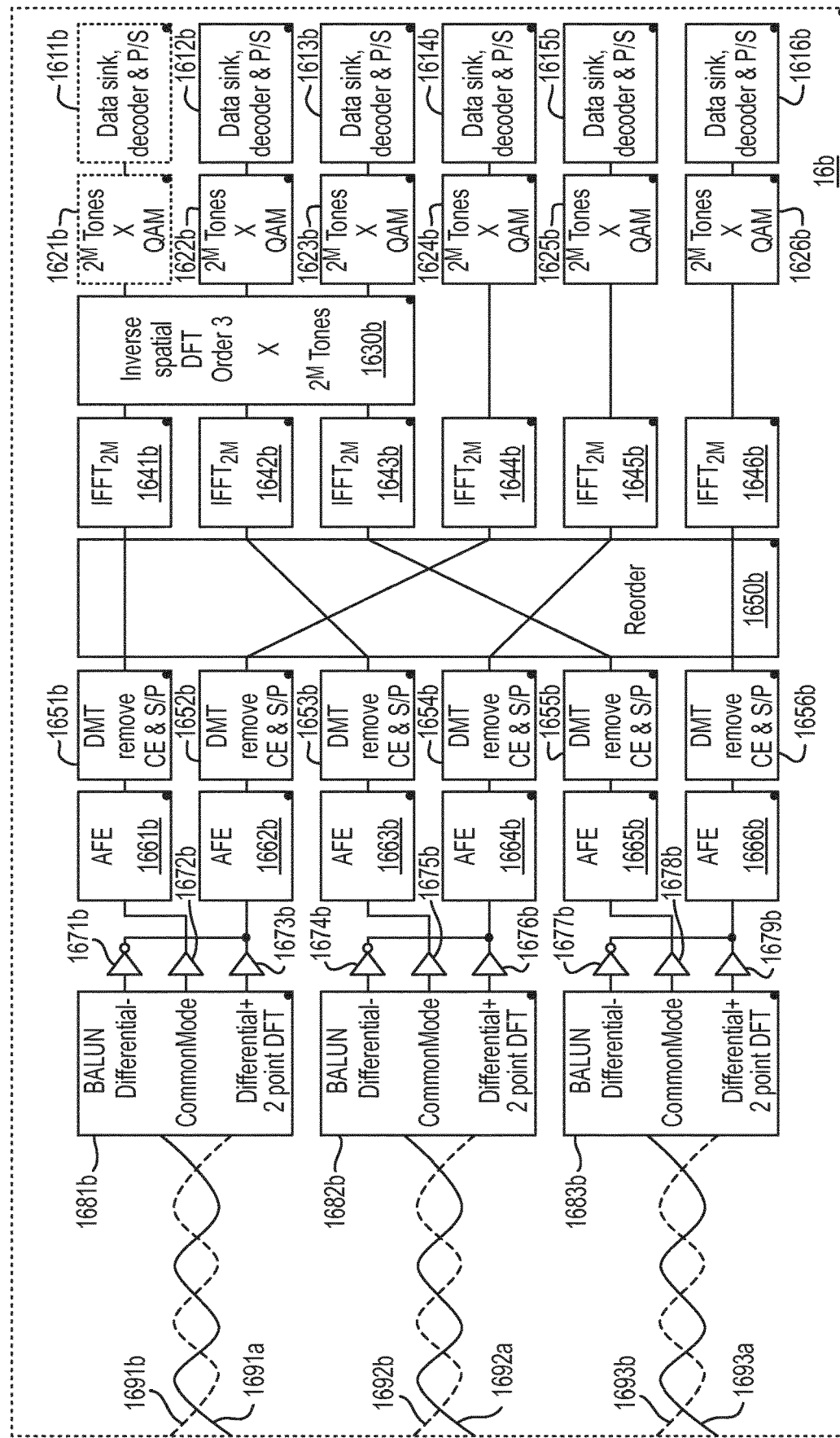
FIG. 3 is a schematic illustration of a receiver portion of one of the transceivers of FIG. 1.

Turning now therefore to FIG. 2, there is shown, in schematic form, a simplified explanatory transmitter portion 16a of one of the transceivers 100. It is a simplified explanatory transmitter portion because, for the purposes of clarity and conciseness, the transmitter portion 16a is illustrated and described as being connected to a corresponding receiver portion 16b of another transceiver 100 via just 3 pairs 1691a,1691b, 1692a,1692b, 1693a,1693b of copper wires; of course it will be understood that in practical embodiments it is desirable for the transceivers to be connected via many more pairs—e.g. via n pairs where n may conveniently be up to 50 or 100 as discussed above. As can be seen, at the far left of the transmitter portion as depicted there are a series of six "sources of data" 1611a-1616a, the topmost 1611a of which is greyed out. Each of these blocks represents the start of a data path which ends at the corresponding data receiver block 1611b-1616b within a communicating receiver portion of a connected transceiver 100. The reason for there being just 6 sources of data is that there are just 3 pairs of wires in this explanatory embodiment. In general, the transceivers 100 are arranged to provide 2n data paths where n is the number of pairs, remembering that one of these paths is a dummy path as described below. The reason for the greying out (of both the topmost data source block 1611a and the topmost data receiver block 1611b) is that no actual data is to be transmitted across this data path because it corresponds to the common mode (of all 3 pairs) form of transmission which is generally so noisy that very little data (if any) can be reliably transmitted using this transmission mode (this common mode of all 3 pairs may hereinafter be referred to as the general-common-mode). In this schematic illustration, the transceivers are illustrated as being connected via 3 twisted metallic pairs. In practice the transceivers are preferably connected via a larger number of such pairs (e.g. up to 50 or 100 pairs); however, for the sake of clarity FIGS. 2 and 3 illustrate a much simpler case comprising only 3 pairs giving rise to 6 possible orthogonal channels, one of which is the common mode (of all pairs) which is the mode accessed via the top path and for this reasons the blocks 1611 and 1621 (in transmitter portion and receiver portion) are shown in greyed out form to indicate that no real data is actually transmitted over this path.

The sources of data are illustrated as being separate for illustrative purposes only. In fact, the data sources are likely in practice to all relate to a single common data source to be transmitted, but it is divided into 5 separate allocations of data to be passed respectively to blocks 1612a-1616a for transmission before being received at the corresponding respective data receivers 1612b-1616b before being re-amalgamated and then forwarded on to a higher layer in the system which is desirous of receiving the transmitted data streams. The topmost data source 1611a is supplied with dummy data. This can be selected in such a way as to serve a number of different useful purposes as will be appreciated by those skilled in the art. For example to achieve a good balance on the lines, or to minimise the peak to average ratio, or with a predetermined set of data to enable external noise impinging on the lines to be estimated, etc.

Additionally, the data source blocks 1611a-1616a include a serial to parallel conversion function as is well known in the art of Discrete Multi-Tone (DMT) transmission systems. Additionally at this stage other conventional functions such as adding Forward Error Correction (FEC), performing interleaving for non-FAST data paths, etc., is performed at this stage. Upon completion of all such processing to the data streams, the data is grouped into groups appropriate for the number of bits to be sent in each tone over each respective channel (the appropriate number for this purpose having been ascertained during a training procedure in a well-known manner, with the possibility of being updated during synchronisation via a bit-swap procedure which is also well known and not relevant to the present invention).

The thus grouped groups of bits are then passed to respective modulator functions, in the present case Quadrature Amplitude Modulators (QAMs) 1621a-1626a in a conventional manner—namely each group of bits for transmission over a single tone is mapped by the QAM to a corresponding vector/complex number within a constellation of such vectors/complex numbers in the normal well-known manner.

The bottom-most three sets of vectors/complex numbers emanating from modulator functions 1624a to 1626a are then passed in a conventional manner to Inverse Fast Fourier Transform (IFFT) blocks 1644a-1646a which generate time domain samples of a continuous signal based on the input vectors/complex numbers passed to it in the well-known manner. These signals are ultimately to be transmitted, after some analogue processing to convert the samples into a continuous analogue signal amongst other things, over a respective metallic pair in conventional differential mode in the well-known conventional manner. These signals may henceforth be referred to as differential mode streams or channels.

The top-most three sets of vectors/complex numbers, however, are passed to a "Spatial Discrete Fourier Transform (DFT) of order 3" module 1630a (note that the spatial DFT module is of order 3 because there are three data paths input to it—there in turn being three such data paths because there are, in this illustrative example, just three pairs of wires interconnecting the transceivers 100—if there were n pairs there would be n data paths and the spatial DFT would be of order n). The function of the Spatial DFT module 1630a is to combine the vectors/complex numbers for each tone, in three different ways, to form three different combinations, in such a manner that the resulting combinations (after suitable conventional DSL processing by a conventional IFFT and analogue processing, etc) when applied to centre taps of driving transformers, driving the (in this case) three wire pairs, creates (in this case) three signals which are carried over the three wire pairs in such a way that they are orthogonal both to themselves and to the conventional differential signals each of which is carried in a conventional differential mode over a respective one of the wire pairs. The particular way in which this is done is set out below mathematically, but in overview it can be described as applying a discrete Fourier transform of order 3 (being the number of pairs of wires—if being carried over n pairs of wires a discrete Fourier transform of order n would be required). As will be appreciated by persons skilled in the art this involves obtaining the $n^{th}$ root of 1 and multiplying each of the n input values by specified integer amounts of this root, where n is the number of input vectors/complex numbers (and also the number of pairs of wires connecting the transceivers 100). The signal paths after the signals have been combined to form the new combined signals may hereinafter be referred to as common mode transmission streams or channels to distinguish them from the differential mode streams or channels carrying single, un-combined data streams.

It will be apparent to persons skilled in the art, that the effect of the "combining" procedure performed by the spatial DFT module 1630a may be considered as splitting each of the input data signals into (in this case) three components. In the case of the first (dummy) data path each of these components has the same phase as one another, hence these components result in exploiting the overall common mode (the general-common-mode) where the signal must be measured by reference to a single common ground voltage such as Earth, and any extraneous noise will be easily coupled into this mode of transmission. On the other hand, both the second and third data signals are split into components with equal, non-zero phase distances to each other (+⅓ of a cycle phase difference between each component in the order output signal 1, output signal 2, output signal 3 (i.e. the signals going to IFFT modules 1641*a*, 1642*a*, 1643*a* respectively in FIG. 2) in the case of the second data signal, and −⅓ of a cycle in the case of the third data signal). This difference in phase of the components of the signals is akin to the difference in phase of the well-known three-phase alternating current power carrying signals. In order to recover the data signals at the receiver portion, these non-zero phase differences must be reversed—in doing this, the resulting changes to the phase differences of both the overall common mode signals, and any noise signals coupled onto the wires (which will tend to also have zero phase difference between them), as well as the other output signal(s) having (a) different non-zero phase difference between the different components, will in sum cancel each other out, thus leaving (in a perfect world) only the desired originally input data signal.

This procedure is carried out (naturally) independently for each tone (of which there may be several thousand) within each frame (of which there may be around 4000 per second).

The three resulting combinations are then passed to conventional IFFT modules 1641*a*-1643*a* for conventional IFFT processing similar to that performed by the bottommost IFFT modules 1644*a*-1646*a* discussed above. This effectively combines the values for each tone for a given combination to form time domain data samples of the 3 (or n where there are n wire pairs rather than 3 wire pairs) combination signals to be transmitted.

For the sake of ease of reference within this document, the parallel flows of data signals passing from left to right in FIG. 2 from data source units 1611*a*-1616*a* through corresponding QAM modulation units 1621*a*-1626*a* but before reaching the Spatial DFT module (for those flows that are processed by this module), as well as the flows in FIG. 3 to the right of the Inverse Spatial DFT module 1630*b*, are hereinafter referred to as data channels since from the perspective of the data emanating from the data source blocks 1611*a*-1616*a* there is a single respective channel from a respective data source block in the transmitter portion to a corresponding data sink block 1611*b*-1616*b*. However, for flows of data/digital/analogue signals to the right of the Spatial DFT module 1630*a* in FIG. 2 and to the left of the Inverse Spatial DFT module 1630*b* in FIG. 3, the flows are referred to as transmission channels. Clearly, the bottom three data channels are directly linked to respective transmission channels, whereas the top three data channels in FIG. 2 are merged in a more complex manner to form three intermingled transmission channels which are only un-intermingled at the Inverse Spatial DFT module 1630*b* in FIG. 3.

In any event, the outputs from the IFFT modules 1641*a*-1646*a* are, in the present embodiment, passed to a reordering module 1650*a* (this is not strictly necessary as the necessary re-ordering could of course be done in a purely analogue manner by connecting the outputs of the AFE modules described below to the correct attachment points of the various driving transformers/baluns, but it is convenient to minimise complex wiring issues which could cause unnecessary problems for what is a trivial digital operation which can be performed in the digital domain with minimal if any additional processing). The reordering module 1650*a* simply operates to ensure that signals intended to be used to excite the centre tap of a driving transformer of a balun module exit the digital processing section adjacent corresponding signals intended to be used to excite the differential tap points of the respective driving transformer of the respective balun.

The outputs from the reorder module 1650*a* are then fed to respective conventional final digital DMT processing modules 1651*a*-1656*a* to add a cyclic extension and to parallel to serial (P/S) convert the signals for transmission. The outputs from the final DMT modules 1651*a*-1656*a* are then passed to respective baluns 1680*a*-1682*a* via inverting (1671*a*, 1674*a*, 1677*a*) and non-inverting (1672*a*, 1673*a*, 1675*a*, 1676*a*, 1678*a*, 1679*a*) amplifiers 1671*a*-1679*a* such that the first pair of wires 1691*a* and 1691*b* carry the signal output by IFFT 1644*a* in differential mode as well as, in common mode, the signal output by IFFT 1641*a*, the second pair of wires carry the signal output by IFFT 1645*a* in differential mode, as well as, in common mode, the signal output by IFFT 1542*a* and finally, the third pair of wires carry the signal output by IFFT 1646*a* in differential mode, as well as, in common mode, the signal output by IFFT 1543*a*. To excite the pairs in differential mode, a single signal is passed to a first one of the wires (e.g. 1691*a*) of the pair via an inverting amplifier (e.g. 1671*a*) and to the other of the wires (e.g. 1691*b*) via a non-inverting amplifier.

Turning now to FIG. 3, in order to recover the transmitted signals from the wires at the far end of the connection, a receiver portion 16*b* approximately reverses the steps performed by the transmitter portion 16*a*. Thus, signals arriving over the pairs of wires 1691-1693 are detected at respective baluns 1681*b*-1683*b* at which a differential signal is recovered by passing the signal from one (e.g. 1691*a*) of the wires through an inverting amplifier (e.g. 1671*b*) and the signal from the other one (e.g. 1691*b*) of the wires in each pair of wires (1691*a,b*; 1692*a,b*; 1693*a,b*) through a non-inverting amplifier (e.g. 1672*b*) and then adding these two signals together, while the common mode signal carried commonly over each pair of wires (e.g. 1691*a,b*) is recovered by passing the output from a centre tap of the transformer of the respective balun (e.g. 1681*b*) via a non-inverting amplifier (e.g. 1672*b*).

The signals output from the amplifiers 1671*b*-1676*b* are then passed to respective Analogue Front End (AFE) units 1661*b*-1666*b* which perform sampling of the signals to obtain digital samples of the signals. These are then passed to respective DMT units 1651*b*-1656*b*. These perform conventional DMT pre-processing including removing the cyclic prefix (which was originally added by the corresponding DMT unit (1651*a*-1656*a*) in the transmitter portion 16*a*) and performing a serial to parallel conversion of the detected digital samples.

The signals output from the DMT units 1651*b*-1656*b* are then passed to a reordering module 1650*b* which simply undoes the reordering performed by the reorder module 1650*a* within the transmitter portion 16*a*. The reordered signals are then passed from the reorder module 1650*b* to a series of Fast Fourier Transform (FFT) modules 1641*b*-1646*b* which operate conventionally to convert the input time-domain signal samples from the time to the frequency domain, outputting frequency components. The output frequency components from the three topmost FFT modules 1641*b*-1643*b* are then passed to an inverse Spatial DFT module 1630*b* which undoes the combining performed by the corresponding Spatial DFT module 1630*a* in the transmitter portion 16*a*. The effect of this is to recover (estimates of) the vectors/complex numbers originally input to the Spatial DFT module 1630*a* in the transmitter 16*a*. The outputs of these are then provided to QAM demodulator units 1621b-1626b which recover the originally input data sets used by the corresponding QAM modulator units 1621a-1626a in the transmitter 16 by using the same constellation mappings as used by the modulator units 1621a-1626a in the transmitter portion.

The resulting sets of data are then passed to data sink units 1611b-1616b which perform inverse operations to those performed by the data source units 1611a-1616a in the transmitter 16a, such as applying any necessary forward error correction, etc. and then pass recovered/corrected data to a higher layer which wishes to receive the data. If the data is actually one single stream of data rather than 5 separate streams, then it may also be recombined in a suitable data aggregator (not shown) as discussed above with reference to the transmitter portion 16a.

Note that the topmost QAM demodulator unit 1621b and data sink unit 1611b are shown as greyed out in FIG. 3. This is because this is the dummy data path as discussed above. Depending on the use made of this path, it is quite likely that these two units could actually be omitted altogether since it is likely that there is no value in decoding this data.

The above described processes can be represented mathematically as follows:

Assume a transmission medium comprising three pairs of wires, $P_0$-$P_2$, where every pair is made of two metallic (e.g. copper) wires such that $$P_0=(W_0 W_1)^T, P_1=(W_2 W_3)^T, P_2=(W_4 W_5)^T$$

In this case $W_0$ corresponds to wire 1691a, $W_1$ to wire 1691b, etc. through to $W_5$ corresponding to wire 1693b. The applied voltage signals to the wires are given by the following column vector:

$$x=(x_0 x_1 x_2 x_3 x_4 x_5)^T$$

These signals are to be processed to provide conventional differential mode signals for transmission over each pair of wires in the conventional differential manner as well as to provide some signals for transmission over common or phantom modes of excitation.

Referring again to FIG. 2, the signal processing performed by an embodiment comprises:

The data from 1611a-1616a are given by D, where $$D=(d_0 d_1 d_2 d_3 d_4 d_5)^T$$

these data, D, are first modulated, for example using M-QAM as illustrated in FIG. 2 at the QAM modulation units 1621a-1626a, at a given subcarrier/tone (n) to produce, for each tone, $$x = \text{MOD}[D] = \text{MOD}\begin{bmatrix} d_0 \\ d_1 \\ d_2 \\ d_3 \\ d_4 \\ d_5 \end{bmatrix} = \begin{pmatrix} x_0 \\ x_1 \\ x_2 \\ x_3 \\ x_4 \\ x_5 \end{pmatrix}$$

Note that 1611 is shown greyed out as mentioned above because it is the dummy path. This corresponds to data, $d_0$, which accordingly is the dummy data. As will be apparent from the equations below, the transformation of $d_0$ via the spatial discrete Fourier transform is such that this data is carried in the undesirable overall or general common mode referred to above. The two other orthogonal non-differential modes carry data $d_1$ and $d_2$ emanating from data source units 1612a and 1613a.

The modulated data x, is passed through the Spatial DFT unit 1630a (in fact only the top three signals $d_0$ to $d_3$ are altered at this stage) which can therefore be expressed mathematically thus:

$$\hat{x} = \begin{pmatrix} \hat{x_0} \\ \hat{x_1} \\ \hat{x_2} \\ \hat{x_3} \\ \hat{x_4} \\ \hat{x_5} \end{pmatrix} = \begin{pmatrix} \omega^0 & \omega^0 & \omega^0 & 0 & 0 & 0 \\ \omega^0 & \omega^1 & \omega^2 & 0 & 0 & 0 \\ \omega^0 & \omega^2 & \omega^1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{pmatrix} \begin{pmatrix} x_0 \\ x_1 \\ x_2 \\ x_3 \\ x_4 \\ x_5 \end{pmatrix},$$

where $$\omega = e^{(-\frac{j2\pi}{3})}$$

or, more generally, $$\omega = e^{((-\frac{j2\pi}{n}))}$$

where there are n pairs of wires. The above equation is for the case where n=3. It will be apparent to the skilled reader that the general equation may be given by:

$$\hat{x} = \begin{pmatrix} \hat{x_0} \\ \hat{x_1} \\ \hat{x_2} \\ \vdots \\ \vdots \\ \hat{x_n} \end{pmatrix} = M \begin{pmatrix} x_0 \\ x_1 \\ x_2 \\ \vdots \\ \vdots \\ x_n \end{pmatrix}$$

where M is a sparse 2n×2n matrix whose bottom left and top right quadrants are full of zeroes, whose bottom right quadrant is a diagonal matrix with 1's along the diagonal and 0's everywhere else and whose top left quadrant is filled with n rows and n columns and each element $e_{i,j}$ being given by $e_{i,j}=\omega^i \cdot \omega^j$ where $0 \leq i \leq (n-1)$ and $0 \leq j \leq (n-1)$ such that the top left element $e_{0,0}=\omega^0=1$ and $e_{n-1,n-1}=\omega^{(n-1)^2}$; also note that $\omega^{l \cdot n+m}=\omega^m$ where l and m are integers (i.e. in the case above where n=3, element $e_{2,2}=\omega^4=\omega^1$ as shown).

Next, $\hat{x}$ is passed though the IFFT units 1641a-1646a to produce time domain discrete signals:

$$\hat{X}_i[k] = \frac{1}{N} \sum_{n=0}^{N-1} \hat{x}_i[n] e^{j\frac{2\pi nk}{N}},$$

Where:
1. i is a channel index which is associated with the IFFT modules (i.e. $\hat{X}_i[k]$ are the time domain samples output by the $i^{th}$ IFFT unit except that the index i ranges from 0-5 rather than 1-6—i.e. if i=1 it refers to IFFT unit 1642a, if i=4 it refers to IFFT unit 1645a, etc.)

2. n is the frequency bin index and N is the total length of the FFT
3. k is the time sample index
4. [x] indicates x being a discrete parameter The time domain samples, $\hat{X}_i[k]$, are then passed through a reorder module 1650a to reorder the six (in this case) sets of time domain samples thus:

$$\hat{\bar{X}}[k] = \begin{pmatrix} \hat{\bar{x}}_0[k] \\ \hat{\bar{x}}_1[k] \\ \hat{\bar{x}}_2[k] \\ \hat{\bar{x}}_3[k] \\ \hat{\bar{x}}_4[k] \\ \hat{\bar{x}}_5[k] \end{pmatrix} = \begin{pmatrix} 1 & 0 & 0 & 0 & 0 & 0 \\ 0 & 0 & 0 & 1 & 0 & 0 \\ 0 & 1 & 0 & 0 & 0 & 0 \\ 0 & 0 & 0 & 0 & 1 & 0 \\ 0 & 0 & 1 & 0 & 0 & 0 \\ 0 & 0 & 0 & 0 & 0 & 1 \end{pmatrix} \begin{pmatrix} \hat{x}_0[k] \\ \hat{x}_1[k] \\ \hat{x}_2[k] \\ \hat{x}_3[k] \\ \hat{x}_4[k] \\ \hat{x}_5[k] \end{pmatrix} = \begin{pmatrix} \hat{x}_0[k] \\ \hat{x}_3[k] \\ \hat{x}_1[k] \\ \hat{x}_4[k] \\ \hat{x}_2[k] \\ \hat{x}_5[k] \end{pmatrix}$$

so that each common mode combined signal $\hat{x}_0$ to $\hat{x}_2$ is grouped with a respective non-combined signal $\hat{x}_3$ to $\hat{x}_5$ for application of pairs of combined and non-combined signals $\hat{x}_0$ and $\hat{x}_3$, $\hat{x}_1$ and $\hat{x}_4$, and $\hat{x}_2$ and $\hat{x}_5$ to respective wire pairs 1691, 1692 and 1693 via respective baluns 1681a, 1682a, 1683a as described below (it is of course immediately apparent how this could be extended to any number of pairs of wires to ensure that each common mode signal is grouped with a respective non-combined signal (i.e. one intended to be transmitted in a differential mode)). Prior to that however, the reordered signals are first passed through respective DMT modules 1651-1656 in which DMT symbols are created by adding a cyclic prefix and converting the discrete time sample values from a parallel to a serial arrangement ready for processing by the AFE units 1661-1666 which convert the discrete time sample values into a continuous signal ready for application to the wire pairs. Prior to applying the signals to the wire pairs 1691, 1692, 1693 via the respective baluns 1681, 1682, 1683, however, the differential signals are passed through inverting and non-inverting amplifiers in the manner already described above. It is interesting to note that the effect of the amplifiers and the balun providing a centre point tap, configured as they are, is to effectively provide a second order spatial DFT unit, in which the common mode combined signal is formed into two components which are applied to both wires equally with no phase difference between them and the non-combined differential mode signal is formed into two components which have an equal, non-zero phase difference between them of half a cycle (i.e. they are anti-phase with one another); one component from each pair of signals are combined together and applied to a respective one of the wires of the respective wire pair.

As mentioned above, the above processes are reversed in the receiver such that, subject to the noise being insufficiently large to cause a detection error at the QAM demodulators 1621b-1626b, the transmitted data is recovered at the data sink units 1611b-1616b. As will be apparent to the skilled user, this involves, at the FFT units 1641b-1646b performing an FFT transformation which, after sampling $\hat{x}_i(t)$ to $\hat{x}_i[k]$, may be expressed as follows:

$$\hat{x}_i[n] = \sum_{n=0}^{N-1} \hat{x}_i[k] e^{-j\frac{2\pi nk}{N}}$$

Figure 4:
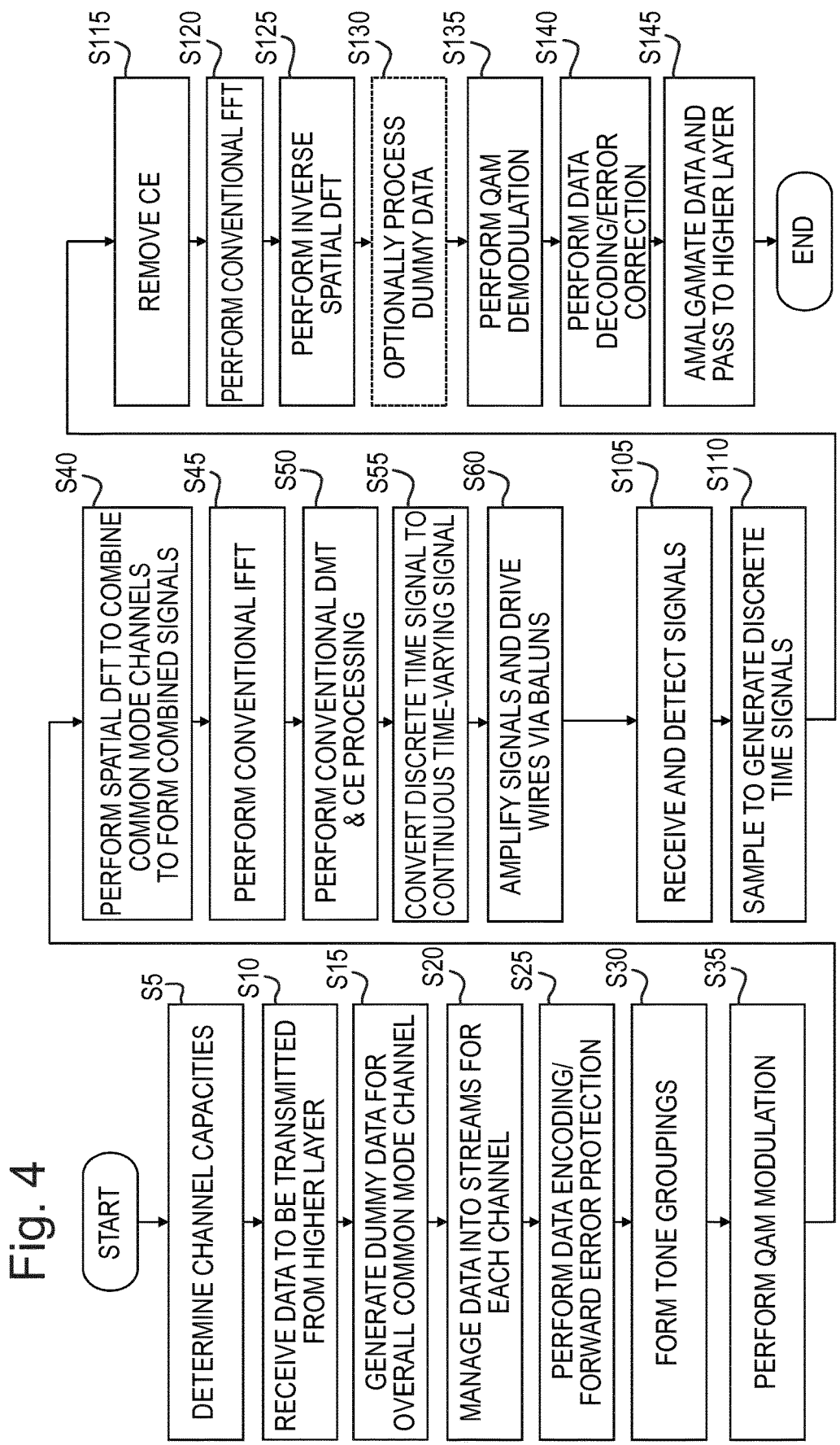
FIG. 4 is a flow diagram illustrating the method performed by the transmitter portion of FIG. 2.

Turning now to FIG. 4, the steps (S5-S60) performed by the transmitter portion and those (S105-S145) performed by the receiver portion in transmitting and receiving signals are now described briefly in overview for completeness' sake.

Upon commencement of the method, the method proceeds to step S5 in which the transmitter portion determines the channels capacities of the available channels. As explained above, in general there are up to 2n-1 usable channels, where n is the number of pairs of wires connected between the transmitter portion and the receiver portion. In the present case there are 3 pairs of wires connected between transmitter and receiver, and therefore 5 usable channels carrying non-dummy data. The normal method for determining the capacity of a single channel, single twisted pair connection can be employed to achieve this. For example, if the wire pair connection is of the order of 100 m-1000 m in length it may be appropriate to use a VDSL2 protocol in which case the normal method for assessing channel capacity during train up can be employed except it may advantageously be done simultaneously for each channel. If the connection is shorter than this it may be more appropriate to use a G.fast type protocol in which case the method employed in that protocol may be used to determine the channel capacity (again with the proviso that in the present case it is most conveniently performed simultaneously for all usable channels so that the effects of cross-talk are automatically present during training and channel estimation). In general, the channel capacity is determined as a normal part of the training process that is indeed the case in the present embodiment.

Having determined the capacities of the data channels in step S5, performed as part of the training or synchronisation procedure, the method proceeds to step S10 in which data to be transmitted over the multi-pair connection is received by the transmitter portion from a higher layer on the device. Additionally, prior to step S20 a step S15 of generating dummy data for transmission over the overall common channel is performed. In the present case a regularly repeating synchronisation pattern of data is transmitted so that the receiver portion could be arranged to perform an estimation of external noise impinging on the system if desired.

The method then proceeds to step S20 in which the data is arranged into data streams each for passing to a respective encoder unit 1611a-1616a. The method then proceeds to step S25 in which the data associated with each stream of data is encoded—in particular, if some of the data is to be sent in an interleaved mode, then interleaving is performed, if some of the data is to have Forward Error Correction (FEC) applied to it, then this is added at this stage. If no interleaving and/or forward error correction is required (e.g. because physical layer retransmission is to be used instead), then nothing need actually be carried out at this stage.

Upon completion of step S25, the method proceeds to step S30 in which groups of data suitable for passing to a QAM modulation encoder function are formed from the received data (which may be received in a serial form and then buffered or received in batches in which case further buffering may not always be necessary). As part of the channel capacity determination process performed in step S5, the number of bits which can be supported by each tone in each frame in each channel is determined and this information is used to group the bits to be transmitted into appropriately sized groups for the respective tone (over which that group of bits is to be transmitted).

Having thus encoded and grouped the bits, the method proceeds to step S35 in which QAM modulation is performed—in particular, at this stage, the bits to be QAM encoded for a particular tone, for a particular frame and for a particular data stream/channel, are mapped to a constellation position which is represented as a complex number having a real and an imaginary part. The size of the constellation depends upon the number of bits which a particular tone is determined to be capable of carrying (i.e. during the channel capacity analysis phase).

Upon completion of step S35, the method proceeds to step S40 in which, for each tone (on a tone-by-tone basis), the complex numbers generated by the preceding QAM modulation process, for a given subset of the data streams/channels, are combined together by performing weighted summations, to form an output set of complex numbers within transmission streams/channels resulting from different combinations formed by applying different weightings (as described in greater detail above) to the data in the data streams/channels of a subset of the data streams/channels. As noted above, the number of output transmission streams of combined complex numbers is the same as the number of input data streams/channels (and also the number of input complex numbers is the same as the number of output complex numbers). The weightings used to form the different combinations are chosen such that the input signals can be recovered using a de-combining set of weightings in an orthogonal manner (i.e. an inverse operation can be performed which involves again forming a weighted combination in such a manner that each originally input signal is completely isolated from the other signals—assuming that there is no crosstalk or inter-symbol interference, etc.—such that no component of the other signals remains after the de-combining operations have been performed). As mentioned suitable weightings for achieving this are orthogonal codes such as Walsh-Hadamard codes for cases where the number of input and output data streams/channels is an exact power of two, or, more generally, a Discrete Fourier Transform code, again as discussed in greater detail above.

Upon completion of step S40, the method proceeds to step S45 in which conventional Inverse Fast Fourier Transformation is performed on each transmission stream in which the complex numbers corresponding to all of the tones for a particular transmission stream are combined together to form a corresponding set of output complex numbers which represent time domain values of a discrete signal corresponding to the input signal which is expressed as the frequency components of the same signal associated with the different tones.

Upon completion of step S45, the method proceeds to step S50 in which further conventional DMT processing is performed—in particular a Cyclic extension is added by repeating the final few signal samples of the set of signals for each transmission stream and adding them to the front of the signal in the well known manner.

Upon completion of step S50, the method proceeds to step S55 in which the discrete time domain signals of each transmission stream/channel are converted into continuous analogue signals suitable for transmission over the wire pairs.

Upon completion of step S55, the method proceeds to step S60 in which the continuous analogue signals of each transmission stream are amplified and then used to drive the wire pairs via a suitable drive transformer. As mentioned above, this is done via baluns which perform differential amplification of the differential mode transmission stream signals and straightforward amplification of the common mode stream signals (which are then applied to a centre tap of the drive transformer).

FIG. 4 then illustrates how the signals are passed, between steps S60 and S105, over the multiple pairs of wires interface, from the transmitter portion to the receiver portion whereupon the steps S105 to S145 are performed by the receiver portion.

Thus at step S105 the signals transmitted by the transmitter portion are received and detected at the receiver portion 16b. As described above, this involves performing inverting and non-inverting amplification on respective wires of each wire pair to recover the differential signals and a single amplification of a centre tap signal at each wire pair to recover the common mode transmission signals.

Each of these signals is then processed at step S110 by the AFE units 1661b-1666b in order to convert the signals into discrete time signals by sampling the continuous signals.

Then in step S115 the cyclic prefix added in step S50 is removed. Then in step S120 conventional Fast Fourier Transform processing is performed to transform the discrete time domain signals into corresponding discrete frequency domain signals in the normal manner.

At step S125 the common mode transmission stream signals are processed by the Inverse Spatial DFT module 1630b to recover the originally input data signals which were processed in step S40.

Upon completion of step S125 there is an optional step S130 of processing the dummy data associated with the overall common transmission mode. as noted above this is likely to contain large amounts of noise, and no actual data to be passed to a higher layer is sent in this data stream, but the recovered data may nonetheless be processed at this stage for signal processing reasons—e.g. to estimate the external noise conditions impinging on the wire pairs.

Upon completion of step S130 (or step S125 if optional step S130 is not being performed) the method proceeds to step S135 in which the recovered data signals are QAM demodulated to recover the original data streams input to the QAM modulation step A35 in the transmitter portion. Then at step S140 any necessary further processing of the recovered data is performed (e.g. de-interleaving, processing forward error correction to remove the error protection overhead and correct any detected errors if necessary, etc.) and then finally the method proceeds to step S145 in which the data is amalgamated if necessary before passing up to a higher layer for further processing of the transmitted data.

Figure 5:
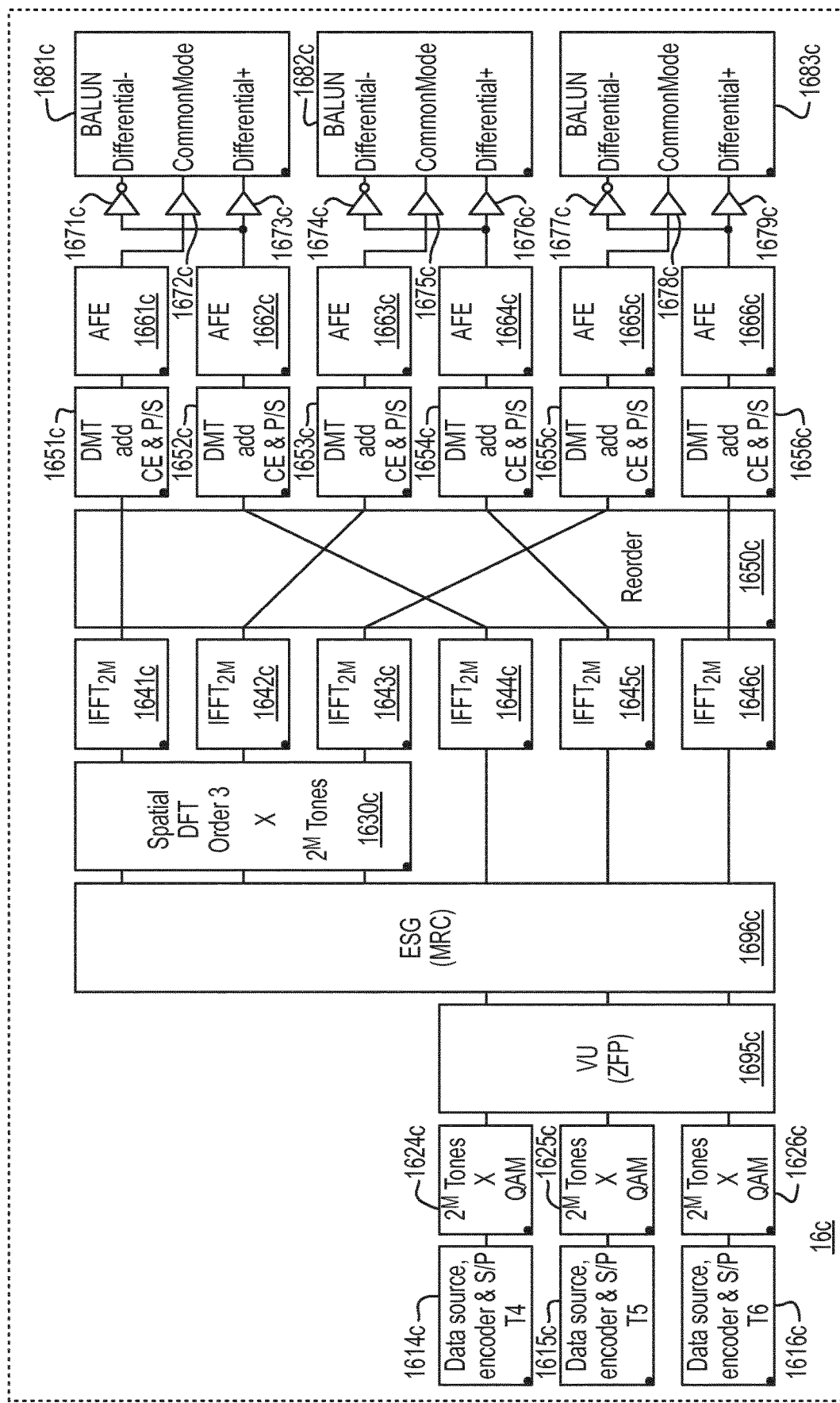
FIG. 5 is a schematic illustration of a transmitter portion of a transceiver according to a further embodiment which is suitable for use in dendritic rather than point-to-point arrangements.

Alternative Embodiment for Use with Dendritic Rather than Point-to-Point Arrangements Turning now to FIG. 5, there is shown a transmitter portion according to an embodiment intended for use in a dendritic network arrangement, rather than in a point-to-point arrangement as was the case with the earlier described embodiment illustrated in FIGS. 2 and 3. In this embodiment the transmitter 16c is connected via 3 pairs of wires 1691, 1692, 1693 (as before although they are not actually shown in FIG. 5) to three separate receiver portions (also not shown). The separate receiver portions (not shown) are not collocated with one another so there is no possibility of doing joint processing at the receiver ends of the wires. Nonetheless, because there is generally cross-talk/mode conversion between common mode signals and differential mode signals it is possible to transmit some useful signals onto the common mode channels which then carry across to a differential mode channel. If the signals after carrying across interfere constructively with the directly transmitted signal, then this energy can improve the Signal to Noise Ratio (SNR) of the directly transmitted signal.

FIG. 5 illustrates a transmitter portion 16c which achieves the above described improved SNR. In general like elements to those illustrated in FIG. 2 have been referenced with like reference numerals except that a "c" suffix replaces the "a" suffix to indicate that they are operating within transmitter 16c rather than transmitter 16a.

A first significant difference between transmitter 16a of FIG. 2 and that of the transmitter 16c of FIG. 5 is that there are only 3 data source units 1614c-1616c. This is because only 3 data streams can be distinguishably transmitted to the three separate receiving portions in this embodiment because it is not possible to transmit data over separate phantom channels and to recover the data at the far end (the only common mode channel which would be accessible in this scenario is the overall common mode channel carrying a signal formed from the average voltage over both wires in one single pair relative to a common ground reference voltage—this is the very noisy channel which is never generally used in practice.)

A second significant difference between the present (dendritic arrangement) embodiment and that of the earlier described (point-to-point) embodiment, is that in the present embodiment, since all of the receivers are separated from one another and not therefore able to do any joint processing, the receivers can be entirely conventional DSL modems, each of which is designed to receive just one signal transmitted in differential mode over a single pair of wires terminated at the receiver. For this reason illustration of the receiver portions has been omitted.

The processing performed in the Data source units 1614c-1616c and the QAM modulation units 1624c-1626c is the same as that performed in the analogous components 1614a-1616a and 1624a-1626a as described above with reference to FIG. 2 and so not further described here.

Once frequency domain signal values have been generated in the QAM modulators 1642c-1646c, these are passed to a noise cancellation unit 1695c which in the present case takes the form of a Zero Forcing Precoder (ZFP) Vectoring Unit (VU) which performs conventional vectoring, treating the three lines (wire pairs) and associated data streams as a vectored group. This vectoring unit 1695c is largely agnostic to the additional processing to the right of it in FIG. 5 (downstream of it) and merely treats the additional processing performed by the Enhancement Signal Generator (ESG) 1696c (described below) and the Spatial DFT unit 1630c as part of the "channel" (being a complex channel having n×n elements (where n is the number of pairs of wires) with non-zero non-diagonal elements indicating cross-talking between the n channels, from the perspective of the vectoring unit, carrying the n data streams over the wire pairs to each respective receiver at which the data stream is to be received—note that as will be seen below, some of the data streams may be transmitted over more than one transmission signal using different modes of transmission; however, this complexity is hidden from the vectoring unit which does not need to take such complexity into account). Owing to this agnosticism, the VU 1695c is able to train up in the conventional manner in order to determine appropriate precoding/vectoring values to use during subsequent normal "showtime" operation.

During normal "showtime" operation of the transmitter (after training and synchronisation etc.) the input signals are pre-coded using vectoring coefficients (which have been determined based on the channel analysis performed during training in any suitable manner). As will be well understood by persons skilled in the art of DSL vectoring, this has the effect of anticipating to a large extent the effects of the signals transmitted onto the other "lines" in the vectoring group in such a way as to cancel a large amount of the effect of those signals, thus largely pre-cancelling the crosstalk effects. The thus pre-coded signals are then passed to the Enhancement Signal Generator (ESG) 1696c which operates according to Maximal Ratio Combining (MRC) principles as now discussed. The effect of the Enhancement Signal Generator (hereinafter referred to as the "ESG(MRC)") 1696c is to generate additional signals, for transmission over (in the present case) unterminated common modes, with a view to these signals cross-talking to a specified receiver and enhancing the SNR of a directly received signal. Each additional signal is derived from one or more of the input pre-coded signals. Furthermore, in addition to generating an extra one or more signals for transmission over channels other than the conventional direct differential mode of transmission over a single pair of wires, the CU(MRC) additionally modifies the phases of the signals to be transmitted to a single receiver via separate channels to account for the difference in phase change caused by the separate channels in such a way that the phase difference of the signals arriving at a specified receiver is minimised. Finally, it may also modify the amplitudes/power of the signals to seek to further optimise the final value of the Signal to Noise Ratio (SNR) of a signal as received at a specified receiver. The specifics of how this is achieved are set out below mathematically.

Note that in the present example embodiment illustrated in FIG. 5, the ESG(MRC) generates three new signals in this way which are passed to a Spatial DFT unit 1630c which operates in exactly the same way as its counterpart unit 1630a in the embodiment illustrated in FIG. 2. In the present case however the topmost signal (which will be transmitted over the overall common mode) is set to zero. One could of course insert an additional unit to generate a non-zero signal for transmission over the common mode if this were desired for any of the reasons set out above with respect to the point to point embodiment—although to take advantage of any such non-zero signal being carried onto the overall common mode, the receivers would need to be adapted to attempt to detect signals carried in this mode.

The three lowermost signals (in the present embodiment), each of which corresponds to a respective one of the signals output from the vectoring unit 1695c (possibly having experienced a phase and/or amplitude change caused by the CU(MRC) 1695c and the three signals output by the Spatial DFT unit 1630c, are then passed to respective IFFT units 1641c-1646c. All further processing, by the IFFT units and all further components to right of the IFFT units (i.e. the reorder unit 1650c, the DMT units 1651c-1656c, the AFE units 1661c-1666c, the inverting 1671c, 1674c, 1677c and non-inverting 167002c, 1673c, 1675c, 1676c, 1678c, 1679c amplifiers and the baluns 1681c-1683c) operate in the same way as the corresponding components in the point-to-point embodiment and are thus not further described here.

The exact processing performed by the transmitter portion 16c can be described mathematically thus:

$$\hat{H} = \left[ \underbrace{\underbrace{\begin{pmatrix} h_{11} & h_{12} & h_{13} & h_{14} & h_{15} & h_{16} \\ h_{21} & h_{22} & h_{23} & h_{24} & h_{25} & h_{26} \\ h_{31} & h_{32} & h_{33} & h_{34} & h_{35} & h_{36} \end{pmatrix}}_{3\times 6 \text{ mixed mode copper channel}} \underbrace{\begin{pmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & \omega^0 & \omega^0 & \omega^0 \\ 0 & 0 & 0 & \omega^0 & \omega^1 & \omega^2 \\ 0 & 0 & 0 & \omega^0 & \omega^2 & \omega^1 \end{pmatrix}}_{\text{spatial fourier transform}}}_{H_{SFT}} \underbrace{\begin{pmatrix} \frac{\overline{h}_{11}}{|h_{11}|} & 0 & 0 \\ 0 & \frac{\overline{h}_{22}}{|h_{22}|} & 0 \\ 0 & 0 & \frac{\overline{h}_{33}}{|h_{33}|} \\ 0 & 0 & 0 \\ \frac{\overline{h}_{15}}{|h_{15}|} & 0 & 0 \\ 0 & \frac{\overline{h}_{26}}{|h_{26}|} & 0 \end{pmatrix}}_{MRC}^{ESG} \right]$$

$$H_{SFT} = \begin{pmatrix} h_{11} & h_{12} & h_{13} & \tilde{h}_{14} = \omega^0(h_{14}+h_{15}+h_{16}) & \tilde{h}_{15} = \omega^0 h_{14}+\omega^1 h_{15}+\omega^2 h_{16} & \tilde{h}_{16} = \omega^0 h_{14}+\omega^2 h_{15}+\omega^1 h_{16} \\ h_{21} & h_{22} & h_{23} & \tilde{h}_{24} = \omega^0(h_{24}+h_{25}+h_{26}) & \tilde{h}_{25} = \omega^0 h_{24}+\omega^1 h_{25}+\omega^2 h_{26} & \tilde{h}_{26} = \omega^0 h_{24}+\omega^2 h_{25}+\omega^1 h_{26} \\ h_{31} & h_{32} & h_{33} & \tilde{h}_{34} = \omega^0(h_{34}+h_{35}+h_{36}) & \tilde{h}_{35} = \omega^0 h_{34}+\omega^1 h_{35}+\omega^2 h_{36} & \tilde{h}_{36} = \omega^0 h_{34}+\omega^2 h_{35}+\omega^1 h_{36} \end{pmatrix}$$

$$\hat{H} = \left[ \underbrace{\begin{pmatrix} h_{11} & h_{12} & h_{13} & \tilde{h}_{14} & \tilde{h}_{15} & \tilde{h}_{16} \\ h_{21} & h_{22} & h_{23} & \tilde{h}_{24} & \tilde{h}_{25} & \tilde{h}_{26} \\ h_{31} & h_{32} & h_{33} & \tilde{h}_{34} & \tilde{h}_{35} & \tilde{h}_{36} \end{pmatrix}}_{H_{SFT}} \underbrace{\begin{pmatrix} \frac{\overline{h}_{11}}{|h_{11}|} & 0 & 0 \\ 0 & \frac{\overline{h}_{22}}{|h_{22}|} & 0 \\ 0 & 0 & \frac{\overline{h}_{33}}{|h_{33}|} \\ 0 & 0 & 0 \\ \frac{\overline{h}_{15}}{|h_{15}|} & 0 & 0 \\ 0 & \frac{\overline{h}_{26}}{|h_{26}|} & 0 \end{pmatrix}}_{MRC} \right]$$

hence, $\ddot{X} = \begin{bmatrix} \ddot{x}_0 \\ \ddot{x}_1 \\ \ddot{x}_2 \end{bmatrix} = [\text{diag}(\hat{H})]_{3\times 3} [\hat{H}^{-1}]_{3\times 3} \begin{bmatrix} x_0 \\ x_1 \\ x_2 \end{bmatrix}_{3\times 1}$ In the above equations, Ĥ designates the modified channel which includes the effects of both the actual mixed mode copper channel H and the effects of the precoding Spatial Fourier Transform and Enhancement Signal Generator (ESG) matrices. It can be seen that the row of zeros (the fourth row) in the ESG matrix specifies that the overall common mode is set to zero. The fifth row in the ESG(MRC) matrix specifies that the signal passed to the middle input of the Spatial DFT unit 1630c comprises the vector-coded 1$^{st}$ data stream (i.e. derived from the data stream output by data source 1614c) because all elements in the first column of the ESG matrix are multiplied by this first data stream. The sixth (and final) row in the ESG matrix contains zeroes in the first and third columns and thus specifies that the third signal input to the Spatial DFT unit 1630c (when counting from the top of FIG. 5) is derived from the second data stream (i.e. as originally generated by the data source 1615c). It can also be seen that the non-zero elements in the ESG matrix are of the form $$\frac{\overline{h}_{ij}}{|h_{ij}|}$$

where $h_{ij}$ is the channel transfer function from channel j to channel i, the channels being viewed from the perspective of the ESG(MRC) 1696c (i.e. the channel indices go from 1 to 6, channel 1 is the direct differential channel over the top most wire pair 1691, channel 2 is the direct differential channel over the middle wire pair 1692, and channel 3 is the direct differential channel over the bottom most wire pair 1693, channel 4 is the overall common mode channel, channel 5 is the composite channel formed by splitting the energy of the signal to be transmitted over this mode into 3 components and phase rotating each component by plus $2\pi/3$ relative to one another (hereinafter the first composite channel) and channel 6 is the composite channel formed by splitting the energy of the signal to be transmitted over this mode into 3 components and phase rotating each component by plus 4π/3 relative to one another (or equivalently by minus 2π/3) (hereinafter the second composite channel). These latter three channels (described by channel transfer functions $h_{ij}$ where $1<=i<=3$ and $4<=j<=6$) are specified in the ESG matrix using the tilde ~ to distinguish them from channels comprising the common mode of a given wire pair—i.e. $h_{i3}$ is the transfer function from the common mode of the topmost wire pair 1691 to the differential mode of the $i^{th}$ wire pair (where $0<=i<=2$). As before, the Spatial DFT matrix demonstrates how the composite channels ($\tilde{h}_{ij}$) are formed from the common modes of the wire pairs ($h_{ij}$ where $1<=i<=3$ and $4<=j<=6$).

As mentioned above, the non-zero elements of the combiner matrix take the form $$\frac{\overline{h_{ij}}}{|h_{ij}|} \text{ or } \frac{\overline{\tilde{h}_{ij}}}{|\tilde{h}_{ij}|}$$

which persons skilled in the art will recognise as the usual phase change applied in order to execute Maximum Ratio Combining. The bar indicates the complex conjugate of the transfer element and the side bars indicate the modulus of the transfer element thus generating, after multiplying by the respective transfer element (which is of course the effect produced by the signal propagating over the respective channel $h_{ij}$ or $\tilde{h}_{ij}$), the modulus of the transfer element (i.e. with a zero phase). The effect of these operations (in an ideal situation) is that the signal transferred (cross-talked) to a respective receiver receiving a signal in differential mode is added to the signal received directly with no (relative) phase difference between these components, thus improving the overall signal to noise ratio of the received signal.

By inspecting the combiner matrix one can see that the first receiver will receive a signal in direct differential mode derived from data stream 1 with a component having been received via the direct differential path (associated with the top element in column 1

$$\frac{\overline{h_{11}}}{|h_{11}|})$$

and a component (associated with the $5^{th}$ element in the first column of the combiner matrix, $$\frac{\overline{\tilde{h}_{15}}}{|\tilde{h}_{15}|})$$

which has cross talk coupled from the first composite channel to the differential mode at the first (top most) receiver. Clearly, changing these elements will affect the signals received at the receivers. For example with the specified combiner matrix, receivers 1 and 2 are being assisted using the first and second composite channels respectively. If one wished to use the first composite channel to assist the third receiver and the second composite channel to assist the first receiver the following combiner matrix would be used instead:

$$\begin{pmatrix} \frac{\overline{h_{11}}}{|h_{11}|} & 0 & 0 \\ 0 & \frac{\overline{h_{22}}}{|h_{22}|} & 0 \\ 0 & 0 & \frac{\overline{h_{33}}}{|h_{33}|} \\ 0 & 0 & 0 \\ 0 & 0 & \frac{\overline{\tilde{h}_{35}}}{|\tilde{h}_{35}|} \\ \frac{\overline{\tilde{h}_{16}}}{|\tilde{h}_{16}|} & 0 & 0 \end{pmatrix}_{MRC}$$

overset{combiner}

Variations

Above we have described both a point-to-point embodiment/arrangement and a dendritic embodiment/arrangement. The person skilled in the art will appreciate that it is of course possible to have hybrid arrangements in which there are multiple links between a transmitter device and a plurality of receivers in which at least one or more of the links comprise more than one pair of wires. In such a case it is possible to have multiple different streams of data carried over multiple wire pair links (up to n−1 where n is the number of such links) and to additionally use unterminated composite channels to carry additional signal energy onto a channel which is terminated via a channel (or composite channel at least some of which underlying common mode channels) which is (or are) not terminated (because terminating the channels would require joint processing between receivers which are not co-located), using the principles set out above with respect to the point-to-point and dendritic embodiments respectively.

The operation of the point-to-point arrangement is preferably enhanced by use of an Eigen beamforming technique. In the point to point systems where the mixed mode channels remain continuous, distributed vectoring precoding can be adopted to achieve cross-talk free transmission. To achieve this, the mixed mode channel is factorised to its eigenvalues and eigenvectors. This type of precoder requires no normalisations since both the precoder and the postcoder are unitary matrices and apply no signal amplifications. It is expected to perform well across all frequencies.

In addition to the precoder and the postcoder, an equaliser is required at the receiver following the postcoder. The equaliser coefficients are the eigenvalues of the channel. This step can be implemented in the transmitting end using water-filling based on the eigenvalues of the channel.

$$\hat{H} = \begin{bmatrix} h_{11} & h_{12} & h_{13} & h_{14} & h_{15} & h_{16} \\ h_{21} & h_{22} & h_{23} & h_{24} & h_{25} & h_{26} \\ h_{31} & h_{32} & h_{33} & h_{34} & h_{35} & h_{36} \\ h_{41} & h_{42} & h_{43} & h_{44} & h_{45} & h_{46} \\ h_{51} & h_{52} & h_{53} & h_{54} & h_{55} & h_{56} \\ h_{61} & h_{62} & h_{63} & h_{64} & h_{65} & h_{66} \end{bmatrix}_H \begin{pmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & \omega^0 & \omega^0 & \omega^0 \\ 0 & 0 & 0 & \omega^0 & \omega^1 & \omega^2 \\ 0 & 0 & 0 & \omega^0 & \omega^2 & \omega^1 \end{pmatrix}_{SFT}$$

6×6 mixed mode copper channel    spatial fourier transform

To decompose $\hat{H}$, we apply singular value decomposition (SVD).

$$SVD(\hat{H}) = V \Lambda U^*,$$

Where U and V are unitary matrices which contain the eigenvectors of the composite channel $\hat{H}$, the operator * denotes the transpose conjugate of U (UU*=I); and $\Lambda$ is a diagonal real valued matrix which contains the eigenvalues of the channel $\hat{H}$.

Hence the transmission model can be rewritten as:

$Y = V \Lambda U^* x$

The precoded signal x becomes:

$\hat{x} = Ux$

At the receiver side, the postcoder becomes:

$\hat{Y} = V^* Y$

Hence the end to end signal transition from the precoder to the postcoder becomes as follows:

$\hat{Y} = V^*(V \Lambda U^* Ux)$

Finally, the received signal will be equalised using $\Lambda$ $\tilde{x} = \Lambda^{-1} \hat{Y}$

The invention claimed is:

1. A method of transmitting a set of data signals over a plurality of pairs of wires numbering three or more pairs of wires, the data signals comprising a first subset of data signals and a second subset of data signals, the method comprising:
    generating a first set of transmission signals, each transmission signal in the first set of transmission signals being derived from a combination of all of the data signals in the first subset of data signals;
    generating a second set of transmission signals, each transmission signal in the second set of transmission signals being derived from a single respective one of the data signals in the second subset of data signals;
    transmitting each of the transmission signals in the first set of transmission signals in a common mode over a respective one of the plurality of pairs of wires; and
    transmitting each of the transmission signals in the second set of transmission signals over a respective one of the plurality of pairs of wires in a differential mode;
    wherein there are first and second receiver devices connected via respective different pairs of wires, wherein a first one of the data signals in the second subset of data signals is destined for the first receiver device and wherein at least one data signal in the first subset of data signals is an enhancement signal generated by an enhancement signal generator which derives the enhancement signal from the first data signal in the second subset of data signals, and wherein the enhancement signal is then transmitted onto a composite channel, the generation of the enhancement signal being performed to minimize a phase difference between a component of the enhancement signal reaching the first receiver device via a cross-talk path from the composite channel to the differential mode channel and a component of the first data signal reaching the first receiver device in a direct differential mode transmitted as one of the transmission signals in the second set of transmission signals.

2. The method according to claim 1 wherein the first and second receiver devices are not collocated such that they form a dendritic arrangement.

3. A transmitter for transmitting a set of data signals over a plurality of 3 or more pairs of wires each pair of wires having a nearside end and a distal end, the nearside end of each pair of wires being connected to the transmitter and at least some of the distal ends of the pairs of wires being connected to one or more receiver devices, the data signals comprising a first subset of data signals and a second subset of data signals, the transmitter comprising: an orthogonal discrete coding transformation unit and an inverse fast Fourier transformation unit, the orthogonal discrete coding transformation unit at least being configured to generate, in combination with the inverse fast Fourier transformation unit, a first set of transmission signals, by combining the data signals in the first subset of data signals using an orthogonal discrete coding transformation and then transforming these into corresponding time domain signals using an inverse fast Fourier transformation, the inverse fast Fourier transformation unit being additionally configured to generate a second set of transmission signals by transforming each data signal in the second subset of data signals into the time domain to form the second set of transmission signals; wherein the transmitter further comprises an analogue front end unit for generating wire driving signals derived from the transmission signals and a series of driving transformers, each of which is connected to the near ends of the wires of a respective one of the pairs of wires, and each driving transformer includes a centre tap connected to receive a driving signal derived from a respective one of the first set of transmission signals, whereby each of the transmission signals in the first set of transmission signals is transmitted in a common mode over a respective one of the plurality of pairs of wires and each of the transmission signals in the second set of transmission signals is transmitted over a respective one of the plurality of pairs of wires in a differential mode.

4. The transmitter according to claim 3 wherein the orthogonal discrete coding transformation unit is a spatial discrete Fourier transformation unit and wherein the orthogonal discrete coding transformation performed by the orthogonal discrete coding transformation unit is a spatial discrete Fourier transformation.

5. The transmitter according to claim 3 including a precoder operating in accordance with an Eigen beam forming, precoding technique in which the multi-mode channel transfer matrix is decomposed into two unitary matrices and a diagonal matrix containing the eigenvalues of the channel transfer matrix and one of the unitary matrices is used by the precoder in a precoding step before passing the precoded data signals to the orthogonal discrete coding transformation unit and/or the inverse fast Fourier transformation unit as appropriate.

6. A receiver for receiving a first and a second set of transmission signals transmitted by the transmitter according to claim 3, the receiver device being connected to a transmitter device by three or more pairs of wires and including an orthogonal discrete decoding transformation unit which is configured to perform an inverse operation of that performed by the orthogonal discrete coding transformation unit of the transmitter device.

7. The receiver according to claim 6 wherein the orthogonal discrete decoding transformation unit is an inverse spatial discrete Fourier transformation unit.

8. The receiver according to claim 6 further including a post-coder operating in accordance with an Eigen beam forming technique wherein one of the unitary matrices obtained by decomposing the channel transfer matrix is used by the post-coder in a post-coding step.

9. A method of transmitting a set of data signals over a plurality of pairs of wires numbering three or more pairs of wires, the data signals comprising a first subset of data signals and a second subset of data signals, the method comprising:

combining all of the data signals in the first subset of data signals to form a combination of all of the data signals in the first subset of data signals;

generating a first set of transmission signals, each transmission signal in the first set of transmission signals being derived from the combination of all of the data signals in the first subset of data signals;

generating a second set of transmission signals, each transmission signal in the second set of transmission signals being derived from a single respective one of the data signals in the second subset of data signals;

transmitting each of the transmission signals in the first set of transmission signals in a common mode over a respective one of the plurality of pairs of wires; and transmitting each of the transmission signals in the second set of transmission signals over a respective one of the plurality of pairs of wires in a differential mode;

wherein all of the data signals are combined in the first subset of data signals using an orthogonal discrete coding transformation and then transforming these into corresponding time domain signals using an inverse fast Fourier transformation when generating the first set of transmission signals, while applying only the inverse fast Fourier transformation to generate the second set of transmission signals by transforming each data signal in the second subset of data signals into a time domain to form the second set of transmission signals.

10. A transmitting device for transmitting a set of data signals over a plurality of pairs of wires, the data signals comprising a first subset of data signals and a second subset of data signals, each of the first and second subsets of data signals comprising at least two different data signals, the transmitting device comprising:

a processor at least configured to:
  combine all of the data signals in the first subset of data signals to form a combination of all of the data signals in the first subject of data signals;
  generate a first set of transmission signals, each transmission signal in the first set of transmission signals being derived from the combination of at least a part of each data signal in the first subset of data signals; and
  generate a second set of transmission signals, each transmission signal in the second set of transmission signals being derived from a single respective one of the data signals in the second subset of data signals; and a transmitter at least configured to:
  transmit each of the transmission signals in the first set of transmission signals in a common mode over a respective one of the plurality of pairs of wires; and
  transmit each of the transmission signals in the second set of transmission signals over a respective one of the plurality of pairs of wires in a differential mode;

wherein the processor is further configured to combine all of the data signals in the first subset of data signals using an orthogonal discrete coding transformation and then transforming these into corresponding time domain signals using an inverse fast Fourier transformation when generating the first set of transmission signals, while applying only the inverse fast Fourier transformation to generate the second set of transmission signals by transforming each data signal in the second subset of data signals into a time domain to form the second set of transmission signals.

* * * * *